United States Patent

[11] 3,578,783

| [72] | Inventors | Pierre Loustalet;<br>Guy Roujas, Tarbes, France |
|---|---|---|
| [21] | Appl. No. | 874,344 |
| [22] | Filed | Nov. 5, 1969 |
| [45] | Patented | May 18, 1971 |
| [73] | Assignee | The French State<br>France |
| [32] | Priority | Nov. 5, 1968 |
| [33] | | France |
| [31] | | 172,592 |

[54] EXTRACTOR FOR AN UMBILICAL CONNECTOR OF A ROCKET
10 Claims, 1 Drawing Fig.

[52] U.S. Cl. .................................................. 185/37,
24/201, 92/15, 244/149
[51] Int. Cl. ...................................................... F03g 1/00,
F15b 15/26
[50] Field of Search .......................................... 185/37;
92/15, (Inquired); 60/7, 7 (A), (Inquired); 24/201
(R), (Inquired); 244/149, 150

[56] References Cited
UNITED STATES PATENTS

| 2,353,440 | 7/1944 | Bresee.......................... | 244/150 |
| 2,825,110 | 3/1958 | Verga........................... | 24/201D |
| 3,193,223 | 7/1965 | Davis............................ | 244/149 |

*Primary Examiner*—Edgar W. Geoghegan
*Attorney*—Waters, Roditi, Schwartz and Nissen ABSTRACT: An extractor for an umbilical connector of a rocket comprises a hook of a piston rod engaging the connector, the piston rod being connected to a piston which is loosely fitted in a cylinder. A lock member engages the piston to hold the same in a ready or armed position in which a spring is compressed between the piston and cylinder. In a first mode of operation, a command signal is given to retract the lock member whereupon the piston is displaced by the spring and the hook pulls the umbilical connector to separate it from the rocket. In a second mode of operation, the hook remains in place and during rocket lift-off the umbilical connector tilts the piston past the lock member whereupon the piston is displaced by the spring to pull the umbilical connector and separate it from the rocket.

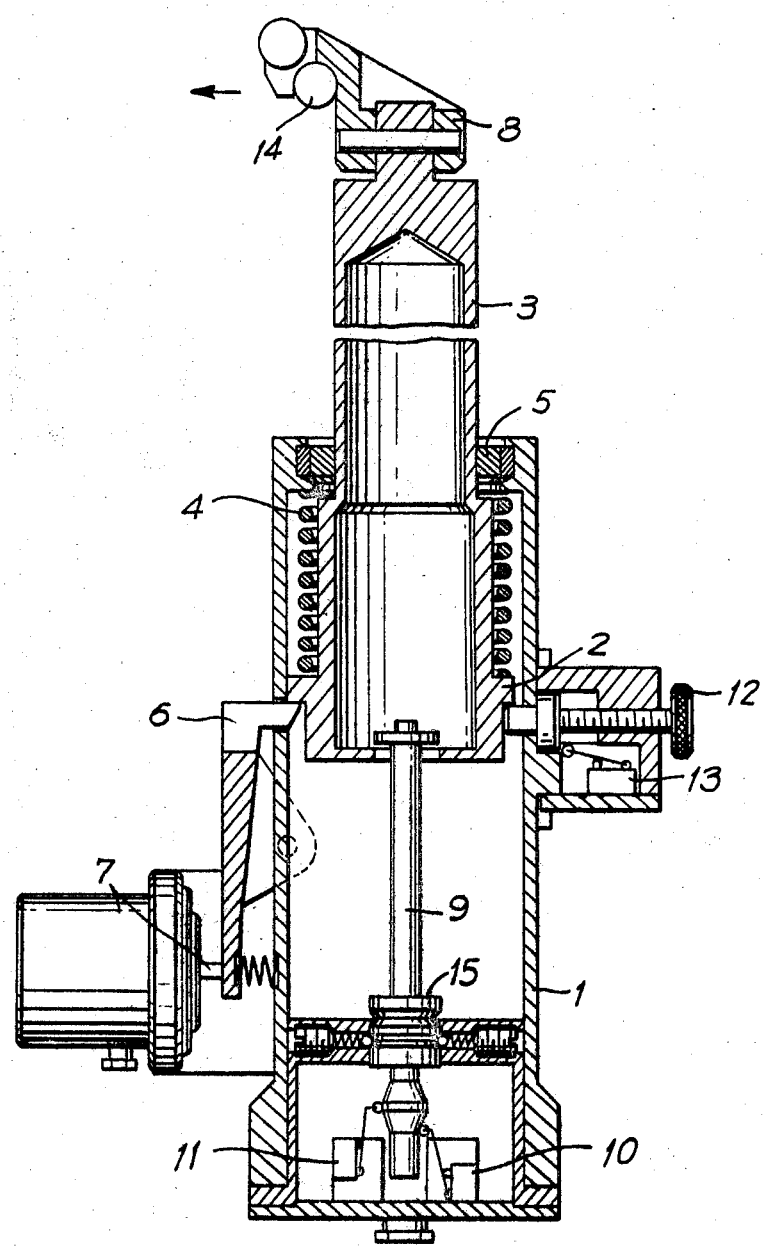

EXTRACTOR FOR AN UMBILICAL CONNECTOR OF A ROCKET

BRIEF SUMMARY OF THE INVENTION

The present invention relates to a device for uncoupling an umbilical connector from a rocket and for removing the connector from the takeoff path of the rocket. This device is known as an extractor or disconnect unit.

During the countdown preceding the launching of a rocket, a considerable conversation in code takes place between the rocket and personnel in a control center. This conversation, consisting of a multitude of checks, is exchanged by means of a cable called the umbilical cord, which connects the monitor apparatus on the rocket with the control center.

The conversation may last up to a few seconds before blast-off and is interrupted by the remote-controlled decoupling of the connectors of the umbilical cord, known as "controlled separation" or the coupling may remain right up to blast-off and be separated by the decoupling of the umbilical cord connectors, occasioned by the starting of the rocket, which is known as "last-moment" separation.

At the present time "last-moment" separation is not the customary practice on rockets in France. The devices using this mode of separation call for extracting poles, which are not very flexible in use and are costly. American practice is the "last-moment" separation using extremely complex pyrotechnical systems with considerable delicate detail and entailing the loss of a part of the connector.

An object of the present invention is to provide a single unit of small dimensions which is operable in either mode in an entirely mechanical and simple manner, eliminating all the drawbacks cited above.

The requisite power for decoupling and separation of the connectors is provided by the release of a spring previously held under constraint by a locking means.

This unit can be feasibly employed in rockets where the diameters between stages thereof are different from each other, because of its large range of removal.

The unit is further provided with a safety device which can lock the unit in the armed position.

The unit includes means for indicating conditions thereof, i.e. unit armed, unit locked, unit unlocked and connector withdrawn, and these allow remote control of the operation.

The unit is made of simple, easily fitted parts and its manufacturing cost is low. The unit is reusable.

According to the invention the unit comprises a displaceable coupling adapted for engagement with an umbilical connector which is separable from a rocket, means engaging said coupling to displace the same to cause separation of the umbilical cord from the rocket, lock means to hold the coupling and prevent displacement thereof, means for inactivating the lock means to allow displacement of the coupling and separation of the members in a first mode of operation, and means for moving the coupling to bypass the lock means and thereby permit the coupling to be displaced with consequent separation of the members in a second mode of operation.

BRIEF DESCRIPTION OF THE DRAWING

The sole FIG. of the drawing shows a disconnect unit in cross section in an armed but locked position.

DETAILED DESCRIPTION

Referring to the drawing, therein is shown an extractor or disconnect unit which comprises a hollow cylinder 1 in which there is displaceably supported a piston 2 which carries an eccentric ring thereon. A piston rod 3 extends from the cylinder 1. A spring 4 acts between the piston 2 and the cylinder 1 to urge the piston towards the bottom of the cylinder 1.

The piston 2 is loosely fitted in the cylinder 1 for a reason to be explained later and a guide 5 is secured in the cylinder 1 and engages the piston rod 3. The guide 5 includes a spherical bearing thus enabling the piston to travel along its axis while undergoing tilting movement within the cylinder 1.

A pivotal lever with a lug 6 which is retractable from and extendable into the cylinder 1 serves as a lock means to hold the piston in the cylinder (with the spring 4 compressed), as shown in the drawing. An electromagnet 7 includes an actuator for acting on the end of the lever remote from lug 6 to retract the lug and permit the piston 3 to be displaced in cylinder 1 by the action of the spring 4.

A swivel hook 8 is mounted at the top of piston rod 3 and the hook is operable to engage the umbilical connector 14 or any other decoupling device to effect separation of the members thereof.

A control rod 9 is operatively associated with the piston 2 for being displaced thereby, and the rod 9 includes profiled portions acting on contacts of microswitches 10 and 11 to indicate the position of rod 9 and hence whether the unit is "active" or "inactive."

A manually operable safety lock screw 12 is supported in the cylinder at the same level as lug 6 and the screw 12 engages the piston 2 beneath the eccentric ring at the thinner portion thereof, to hold the piston 2 in an inoperative position. The screw 12 cooperates with a contact of microswitch 13 to indicate whether screw 12 is in engagement with the piston or disengaged therefrom.

In the drawing there is shown the umbilical connector 14 engaged by hook 8. During rocket blast-off, the connector 14 moves to the left, as shown by the arrow in the drawing. This will initiate separation of the umbilical connector if this has not been previously effected by retraction of lug 6.

The operation is as follows:

The disconnect unit is first armed. This is achieved by manually turning screw 12 so that it is withdrawn from the cylinder 1. This condition will be sensed by the activation of microswitch 13.

The piston 2 is then retracted in cylinder 1 to compress spring 4, this being achieved by means of a jack engaged between cylinder 1 and hook 8. Near the end of its stroke, the piston 23 carries control rod 9 therewith which operates microswitch 11 to indicate that the piston 2 is in active or armed position. At the same time, the lug 6 which was urged out of the cylinder 1 by the ring during the lifting of the piston in the cylinder returns to its locking position and holds the piston in its active position with the spring 4 compressed.

The disconnect unit is then attached to the umbilical cord 14 and is anchored at the launch pad.

The unit is now ready for operation either by a command signal or by extraction during lift-off. Namely, there are two possible modes of operation.

The first mode of operation is by command signal. In this case, the electromagnet 7 is operated to act on lever 7 and retract lug 6. The piston 2 is thereupon rapidly and forcibly displaced by spring 4 downwardly in cylinder 1. The umbilical connector 14 which is engaged with hook 8 is drawn with the piston so as to effect separation of the umbilical connector from the rocket. The umbilical connector 14 is initially somewhat taut and the hook 8 engages the connector 14 at an intermediate point along its length to insure separation of connector 14 from the rocket by the sharp pull produced by the travel of the piston in the cylinder. The hook 8 is adaptable to the particular connector in use or any other decoupling device. At the end of its stroke the bottom of piston 2 contacts an abutment 15 on rod 9 to displace the rod and activate microswitch 10 which will indicate separation of the umbilical cord from the rocket. The stroke of the piston 2 is sufficient so that the umbilical cord and the plug thereon will be displaced by the piston rod 3 far enough from the rocket to permit unimpeded passage thereof.

The second mode of operation is by "last moment" separation. In this case, the rocket at lift-off moves along the direction of the arrow in the drawing thereby pulling the umbilical cord 14 and the piston rod 3 therewith. This causes the piston 2 to tilt in the cylinder about guide 5 as a pivot. Due to the loose fit of piston 2 in the cylinder, it can move past lug 6 until it is released therefrom, whereupon the spring 4 now displaces the piston downwardly in the cylinder to produce separation of the umbilical cord in the same manner as indicated hereinabove in the first mode of operation.

From the above it is seen that the piston 2 and rod 3 serve as a coupling between the umbilical cord 14 and the spring 4 to cause separation of the umbilical cord by inactivation of the lock means 6 in the first mode of operation and by movement of the piston 2 of the coupling to bypass the lock means 6 in the second mode of operation.

We claim:

1. A disconnect unit comprising a displaceable coupling adapted for engagement with a member which is separable from another member, means engaging said coupling to displace the same to cause separation of the members, lock means to hold the coupling and prevent displacement thereof, means for inactivating the lock means to allow displacement of the coupling and separation of the members in a first mode of operation, and means for moving the coupling to bypass the lock means and thereby permit the coupling to be displaced with consequent separation of the members in a second mode of operation.

2. A unit as claimed in claim 1 comprising indicator means connected with said coupling for sensing the held and displaced positions of the coupling.

3. A unit as claimed in claim 1, wherein said coupling comprises a piston and the unit comprises a cylinder in which the piston is displaceable, 4. A unit as claimed in claim 3, wherein said lock means comprises a retractable stop member within said cylinder for blocking movement of the piston.

5. A unit as claimed in claim 4, wherein said means to displace the coupling comprises a spring acting between said cylinder and piston to displace the latter.

6. A unit as claimed in claim 5, wherein said piston is loosely fitted in said cylinder for tilting movement therein, said means for moving the coupling to bypass the lock means comprising means connected to the piston for engaging the first said member to tilt the piston and bypass the lock means when said first member is displaced.

7. A unit as claimed in claim 6 comprising a guide between said coupling and cylinder to permit longitudinal displacement of the piston, said guide including a spherical bearing permitting pivotal movement of the piston within the cylinder.

8. A unit as claimed in claim 7, wherein said lock means comprises a pivotal lever with a lug at one end constituting said retractable stop member, and means acting on said lever at the other end thereof to retract and extend said lug.

9. A unit as claimed in claim 8 comprising a manually operable safety lock engaging the coupling to prevent movement thereof.

10. A unit as claimed in claim 9, wherein said piston includes an eccentric ring thereon for engagement with the lug at the thicker portion of the ring and the safety lock at the thinner portion of the ring.